United States Patent Office 3,637,741
Patented Jan. 25, 1972

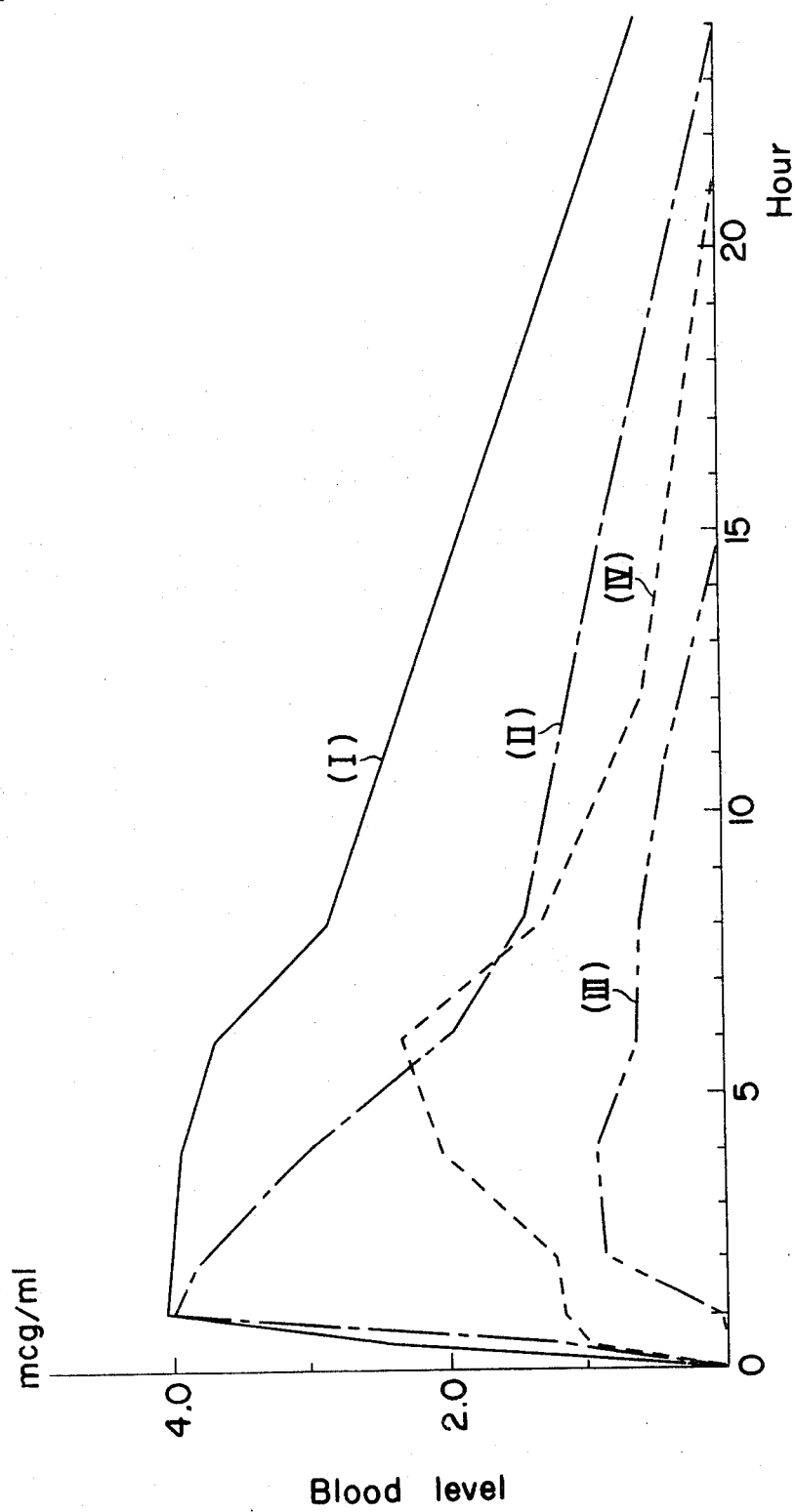

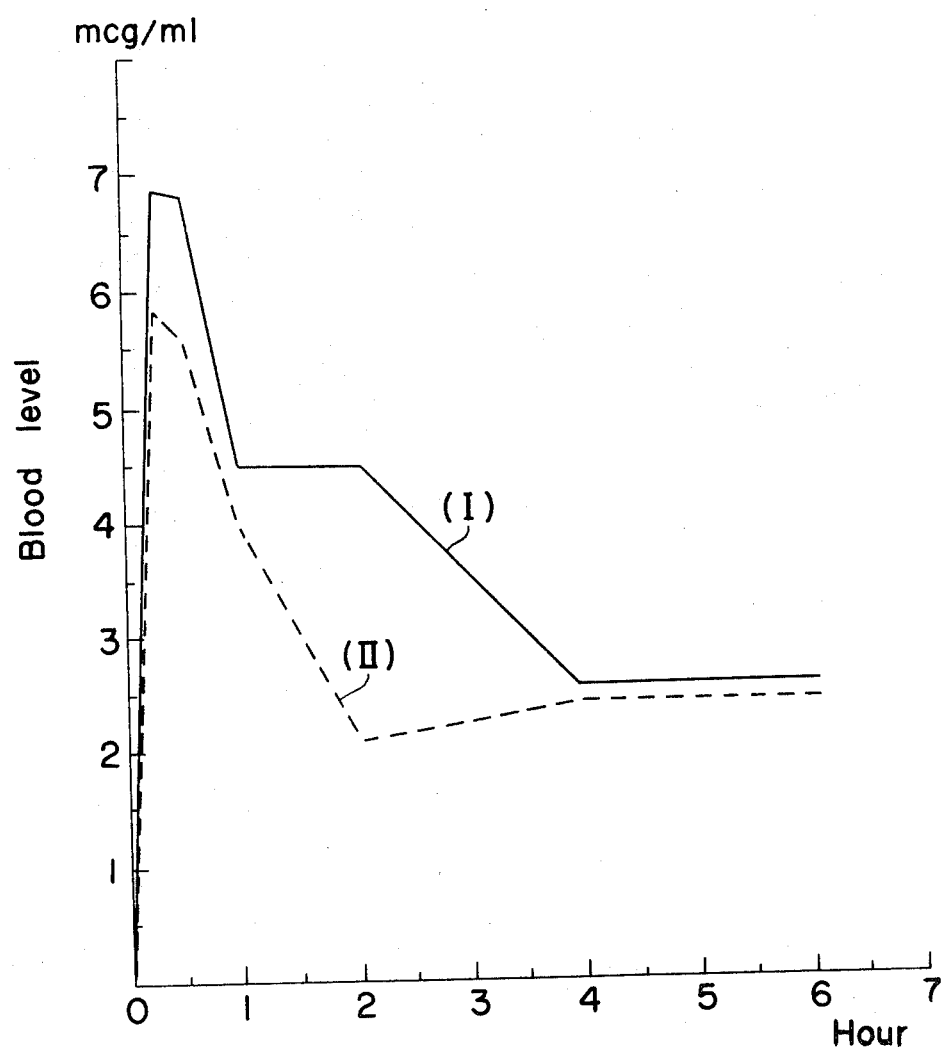

3,637,741
TETRACYCLINE DERIVATIVES
Takeshi Mayama, Kawasaki-shi, Taro Miura, Yokohama-shi, and Kazuo Saito, Fujisawa-shi, Japan, assignors to Meiji Seika Kaisha, Ltd., Tokyo, Japan
Filed July 28, 1969, Ser. No. 845,183
Int. Cl. C07c 103/19
U.S. Cl. 260—326.3
4 Claims

ABSTRACT OF THE DISCLOSURE

New tetracycline derivatives of the general formula

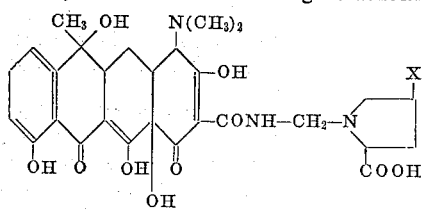

and the acid-addition salts and base salts thereof, wherein X is selected from the group consisting of hydrogen and hydroxyl.

---

This invention relates to new and useful tetracycline derivatives and a process for the preparation thereof. The new tetracycline derivatives according to the present invention may be formed by the reaction of tetracycline or its salt with formaldehyde and proline or hydroxyproline and are adapted for therapeutic use by virtue of their remarkably improved physical and pharmaceutical properties.

It is known that tetracycline antibiotic is of limited theraputic use owing to lack of water-solubility and that an improved water-solubility may be imparted to tetracycline either by reacting tetracycline with formaldehyde and a dialkyl amine, piperidine, pyrrolidine or morpholine (German Pat. No. 1,044,806, No. 1, 063,598 and No. 1,088,-481; and British Pat. No. 809,586), or by reacting tetracycline with formaldehyde and lysine or alanine (U.S. Pat. No. 3,042,716). It has been reported that the aminomethyl derivatives of tetracycline which may be prepared by reacting tetracycline with a dialkyl amine, piperdine, pyrrolidine or morpholine exhibit antibacterial action similar to the tetracycline when administered intravenously but they show considerably lower antibacterial action than the tetracycline when administered orally (E. N. Ewald and G. S. Redin "Antibiotics and Chemotherapy" pages 419–421 (1960)). It has further been reported that the tetracycline methylene lysine which may be formed by reacting 1 molar proportion of tetracycline with about 1–2 molar proportion of formaldehyde and about 1 molar proportion of lysine provides higher serum levels than the tetracycline hydrochloride and also than the tetracycline methylene pyrrolidine which is the product of German Pat. No. 1,044,806 (see Japanese patent publication No. 10533/1963). The tetracycline methylene lysine is somewhat valuable for therapeutic use but it is still disadvantageous in that it can cause an acute pain in injection site when injected intramuscularly or intravenously (see "Chemotherapy" vol. 13, No. 5, pages 407–409 (1965)).

We have now found that by chemical reaction of tetracycline with proline or hydroxyproline which bear a carboxyl group at the 2-position of the pyrrolidine ring and which is distinct in this respect from the previously used compounds such as pyrrolidine and lysine, there may be obtained the new tetracycline derivatives of the general formula as mentioned hereinafter which have very much improved physical and pharmaceutical properties than those of the tetracycline methylene pyrrolidine and the tetracycline methylene lysine.

Accordingly we provide the new derivatives of tetracycline represented by the following general formula

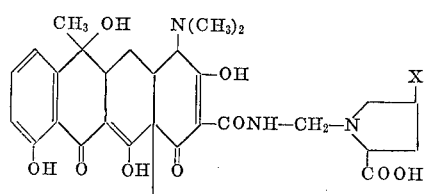

and the acid-addition salts and base salts thereof wherein X is a hydrogen atom or a hydroxyl group.

The new derivatives of tetracycline of the present invention are capable of forming salts with either acids or bases due to the presence of basic nitrogen atoms and a carboxyl group.

The new derivatives of tetracycline according to the present invention, therefore, include the acid-addition salts such as hydrochloride, hydrobromide, sulfate, nitrate, phosphate, acetate, citrate, tartarate, mallate, gluconate, ascorbate and the like thereof as well as the base salts (carboxylates) such as sodium salt, potassium salt, calcium salt and magnesium salt and the other pharmaceutically acceptable salts thereof.

The new tetracycline derivatives of this invention when the symbol X is a hydrogen atom in the above-mentioned general formula may be called the tetracycline methylene proline, and those when the symbol X is a hydroxyl group may be called the tetracycline methylene hydroxyproline.

The new tetracycline derivatives according to the present invention are remarkably advantageous in that they have an improved water-solubility of about twice higher than the tetracycline methylene lysine, that they exhibit a lower acute toxicity than the tetracycline methylene lysine, that they provide higher serum levels than the tetracycline methylene lysine when injected intravenously, that they give little pain to patent than the tetracycline methylene lysine, and that they provide higher and longer serum levels than the tetracycline methylene pyrrolidine when administered orally.

Properties of the tetracycline methylene proline and tetracycline methylene hydroxyproline of the present invention are now described in more detail.

Water-solubility of the tetracycline methylene proline of this invention is 2.609 g. per ml. of water at pH 7 at 20° C. whereas the water-solubility of the tetracycline methylene lysine is only 1.017 g. per ml. of water under the same conditions. The tetracycline methylene proline of this invention may be soluble in water over a wide pH range of 2 to 10, so that its aqueous solutions suitable for intravenous and intra-muscular injection may be prepared readily. Good tolerance may be observed in the site of injection. In contrast to this, the tetracycline hydrochloride which has usually been used to prepare parenterally injectable solutions is soluble only in water having an extremely low or high pH range and is usually deposited in the tissue of body where the solution was injected. Thus, the tetracycline hydrochloride exhibits poor tolerance at the site of injection.

Acute toxicity of the various tetracycline derivatives was determined by intravenous injection at a rate of about 1 ml./minutes in mice. Values for $LD_{50}$ (mg. as tetracycline hydrochloride per kg. of the body weight) were estimated to be as follows.

| Tetracycline derivatives: | $LD_{50}$[1] |
|---|---|
| Tetracycline (comparative) | 220 |
| Tetracycline methylene pyrrolidine (comparative) | 115 |
| Tetracycline methylene lysine (comparative) | 253 |
| Tetracycline methylene proline (according to this invention) | 263.3 |
| Tetracycline methylene hydroxyproline (according to this invention) | 273 |

[1] Mg. as tetracycline hydrochloride/kg. in potency.

A series of tests was carried out to determine changes in the blood levels of the tetracycline methylene proline, the tetracycline methylene hydroxyproline, the tetracycline methylene pyrrolidine and the tetracycline hydrochloride when these antibiotics were orally administered to nine dogs in the form of capsule at a dosage of 20 mg./kg. (as tetracycline hydrochloride). A further series of tests was also carried out to determine changes in the blood levels of the tetracycline methylene proline and the tetracycline methylene lysine when these antibiotics were intravenously injected to a dog at a dosage of 5 mg. (as tetracycline hydrochloride) per kg. of the body weight in the form of aqueous solutions containing 5 mg. (as tetracycline hydrochloride) of the antibiotic substance per 0.5 cc. of the solution.

FIG. 1 shows the blood level curves of the tetracycline methylene proline, the tetracycline methylene hydroxyproline, the tetracycline methylene pyrrolidine and the tetracycline hydrochloride determined after the oral administration.

FIG. 2 shows the blood level curves of the tetracycline methylene proline and the tetracycline methylene lysine as determined after the intravenous injection.

In FIG. 1, the blood levels of the antibiotics are plotted in mcg./ml. as the ordinates and the elapsed time after the administration is plotted in hour as the abscissae. The blood levels were estimated by bioassay on agar plate with *Bacillus cereus varietas mycoides*. Curve I shows the change in blood levels of the tetracycline methylene proline, curve II the change in blood levels of the tetracycline methylene hydroxyproline, curve III the change in blood levels of the tetracycline methylene pyrrolidine and curve IV the change in blood levels of the tetracycline hydrochloride. The tetracycline methylene proline and hydroxyproline exhibited a blood level of 4 mcg./ml., 1 hour after the administration, and the tetracycline methylene proline sustained a blood level of 3 mcg./ml., even 8 hours after the administration. In contrast to this, the tetracycline methylene pyrrolidine exhibited only a maximum blood level of 1 mcg./ml., 4 hours after the administration while the tetracycline hydrochloride exhibited a maximum blood level of 2.4 mcg./ml., 6 hours after the administration. From this, it is clear that the tetracycline methylene proline and hydroxyproline according to the present invention are very much more rapidly absorbed from the gastro-intestinal tract, giving higher and longer sustained blood levels than the prior tetracycline methylene pyrrolidine and the tetracycline hydrochloride. Thus, it may be expected that oral administration of the tetracycline methylene proline and hydroxyproline according to the present invention have much higher therapeutic efficacy than that of the tetracycline methylene pyrrolidine and the tetracycline hydrochloride have.

In FIG. 2, the blood levels are plotted in mcg./ml. as the ordinates and the time in hour as the abscissae. The blood levels were determined by bioassay on agar plate with *Sarcina lutea*. Curve I shows the change in blood levels of the tetracycline methylene proline and curve II the changes in blood levels of the tetracycline methylene lysine. From the comparison of curve I with curve II, it is apparent that the tetracycline methylene proline according to the present invention provides generally higher blood levels than the tetracycline methylene lysine during the treatment and that the tetracycline methylene proline provides the blood levels of approximately twice as much than the tetracycline methylene lysine in the period of 2 hours after the intravenous injection. Similar results have been observed for the tetracycline methylene hydroxyproline according to the present invention. Thus, it may be expected that the tetracycline methylene proline and hydroxyproline of the present invention exhibit remarkably higher therapeutic efficacy than the tetracycline methylene lysine.

From the above-mentioned facts, it is clear that the new tetracycline derivatives of the present invention may have very much profitable, pharmaceutical and therapeutic properties when formulated and applied in either oral or parenteral administration. It appears that the improved water-solubility and other very much useful properties of the new tetracycline derivatives of the present invention are owing to the chemically bonded proline or hydroxyproline molecule which bear a carboxyl group on the pyrrolidine ring.

As previously mentioned, the new tetracycline derivatives of the present invention are substances formed by the reaction of tetracycline with formaldehyde and with proline or hydroxyproline. The reaction may be effected by merely contacting tetracycline or its acid-addition salt with formaldehyde and proline or hydroxyproline in an organic solvent such as methanol, ethanol, isopropanol, tertiary butanol, tetrahydrofuran and methylene chloride etc. The organic solvent used may contain a proportion of water. The reagents may be added simultaneously or individually, in any order. The reaction may suitably be carried out at a temperature of 20° C. to 80° C. for a period of 30 minutes to 6 hours. Value of pH is not critical in the reaction mixture.

According to a further aspect of the present invention, therefore, we provide a process for the preparation of the new tetracycline derivatives of the general formula:

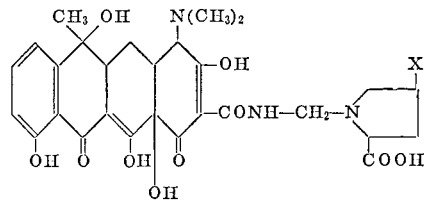

and the acid-addition salts and base salts thereof wherein X is a hydrogen atom or a hydroxyl group, which comprises a step of reacting tetracycline or its acid addition salt with formaldehyde and with proline or hydroxyproline or a salt thereof. It is preferred to employ the reagents in substantially equimolar proportions. When the reaction is carried out in an aqueous reaction medium, it is preferred that the organic solvent used is present there in an amount sufficient to maintain the reagents in solution.

The invention is now illustrated with reference to the following examples to which the present invention is not limited.

EXAMPLE 1

To a solution of 44.4 g. of tetracycline (free base) in 1000 ml. of methanol were added a solution of 11.5 g. of L-proline in 12 ml. of water and 14 ml. of an aqueous 37% solution of formaldehyde. The mixture was agitated at 40° C. to 60° C. for 6 hours during which the reaction had been completed. When the reaction mixture was concentrated by evaporating the methanol under vacuum, yellow colored precipitate deposited. The precipitate was filtered, washed with a small amount of methanol and dried to yield 55 g. of the tetracycline methylene proline which was of light yellow color and decomposed at 145 to 156° C. This product showed a potency of 762 mcg./mg. determined by a standard bioassay, and it had a solubility of 2.609 g. in 1 ml. of water at 20° C. Optical rotation of this product was $[\alpha]_D^{22} = -214°$ (c.=1.0, $H_2O$).

Analysis.—Calculated as $C_{28}H_{33}N_3O_{10}$ (percent): C, 58.84; H, 5.82; N, 7.35; O, 27.99. Found (percent): C, 58.43; H, 6.32; N, 7.56; O, 27.69.

EXAMPLE 2

To a solution of 44.4 g. of tetracycline in 1000 ml. of methanol were added a solution of 13.1 g. of L-hydroxyproline in 25 ml. of water and 14 ml. of an aqueous 37% solution of formaldehyde. The mixture was agitated at 40° C. to 60° C. for 50 minutes during which the reaction had been completed. The reaction mixture was concentrated by evaporating the methanol under vacuum, and a precipitate of dark yellow color was formed. This precipitate was filtered, washed with a small amount of methanol and dried at 40° C. under vacuum. There yielded 56 g. of the tetracycline methylene hydroxyproline which was of yellow color and decomposed at 155° C. to 170° C. This product showed an optical rotation of $[\alpha]_D^{26} = -237°$ (c.=1, $H_2O$) and a solubility of 1900 mg. in 1 ml. of water at 20° C. This product showed a potency of 744 mcg./mg.

Analysis.—Calculated as $C_{28}H_{33}N_3O_{11}$ (percent): C, 57.24; H, 5.66; N, 7.15; O, 29.95. Found (percent): C, 56.83; H, 6.04; N, 7.11; O, 30.02.

EXAMPLE 3

To a solution of 44.4 g. of tetracycline in 1000 ml. of methanol were added 14 ml. of an aqueous 37% solution of formaldehyde and then a solution of 11.5 g. of DL-proline dissolved in a mixture of 12 ml. of water and 20 ml. of methanol. The resulting admixture was agitated at 40° C. to 60° C. for 45 minutes to complete the reaction. The reaction mixture was then treated in the same manner as in Example 1, and 54 g. of the tetracycline methylene proline of lightly yellow color was obtained, which exhibited a potency of 759 mcg./mg.

EXAMPLE 4

To a solution of 48 g. of tetracycline hydrochloride in 1000 ml. of methanol were added a solution of 11.5 g. of L-proline in 12 ml. of methanol and 14 ml. of an aqueous 37% solution of formaldehyde. The mixture was then treated in the same manner as in Example 1. There was obtained 57 g. of the tetracycline methylene proline of lightly yellow color which had a potency of 721 mcg./mg.

EXAMPLE 5

The procedure of Example 1 was repeated using a solution of 44.4 g. of tetracycline in 600 ml. of t-butanol at about 30° C. The tetracycline methylene proline was obtained at a yield of 54 g.

EXAMPLE 6

The tetracycline methylene proline product (free base) of Example 1 was dissolved in water, and to this aqueous solution was added equivalent of hydrochloric acid. The solution was dried under vacuum to yield the tetracycline methylene proline hydrochloride as powder.

Similarly, the sulfate salt, nitrate salt, citrate salt and the other acid-addition salts of the tetracycline methylene proline may be prepared from the free base product of Example 1.

EXAMPLE 7

The free base product of Example 1 was dissolved in an aqueous solution containing equimolar sodium hydroxide. The mixture was dried under vacuum to yield the sodium salt (carboxylate) in the form of a powder.

The potassium salt, calcium salt and magnesium salt etc., may be prepared similarly from the free base product of Example 1.

What we claim is:
1. Tetracycline derivatives of the general formula

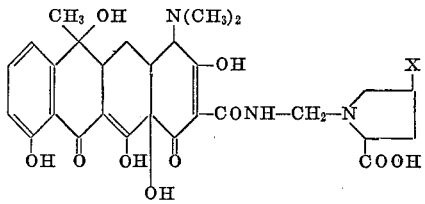

and pharmaceutically acceptable acid-addition and base salts thereof, wherein X is selected from the group consisting of hydrogen and hydroxyl.

2. The tetracycline methylene proline of the formula:

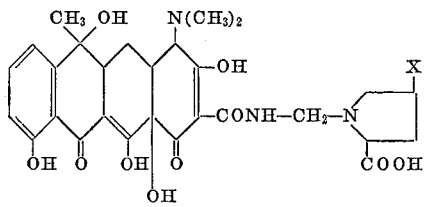

3. The tetracycline methylene hydroxyproline of the formula:

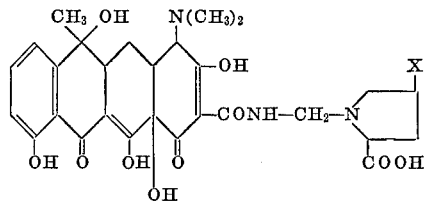

4. The hydrochloride of the tetracycline methylene proline.

References Cited

UNITED STATES PATENTS 3,388,161    6/1968    Lancini et al. _____ 260—559

ALEX MAZEL, Primary Examiner

A. M. T. TIGHE, Assistant Examiner

U.S. Cl. X.R.

260—559 AT; 424—200, 227, 274